United States Patent
Paschall et al.

(10) Patent No.: US 11,703,861 B1
(45) Date of Patent: Jul. 18, 2023

(54) INVENTORY SYSTEM WITH HIGH-SPEED CORRIDORS FOR AUTONOMOUS SURFACE VEHICLES

(71) Applicant: Amazon Technologies, Inc., Seattle, WA (US)

(72) Inventors: Stephen Charles Paschall, Cambridge, MA (US); Justin Croyle, Hampstead, NH (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 17/210,911

(22) Filed: Mar. 24, 2021

(51) Int. Cl.
*G05D 1/00* (2006.01)
*G06Q 10/087* (2023.01)
*G05D 1/02* (2020.01)

(52) U.S. Cl.
CPC ......... *G05D 1/0088* (2013.01); *G05D 1/0214* (2013.01); *G05D 1/0223* (2013.01); *G05D 1/0268* (2013.01); *G06Q 10/087* (2013.01); *G05D 1/0238* (2013.01)

(58) Field of Classification Search
CPC .. G05D 1/0088; G05D 1/0214; G05D 1/0223; G05D 1/0268; G05D 1/0238; G06Q 10/087
See application file for complete search history.

(56) References Cited

U.S. PATENT DOCUMENTS

| | | | |
|---|---|---|---|
| 10,242,273 B1* | 3/2019 | Eckman | G06T 7/75 |
| 10,528,828 B2* | 1/2020 | Eckman | G01S 5/16 |
| 2005/0278062 A1* | 12/2005 | Janert | G06Q 50/28 700/214 |
| 2007/0136152 A1* | 6/2007 | Dunsker | G06Q 10/087 705/28 |
| 2007/0222674 A1* | 9/2007 | Tan | G01S 19/49 342/357.32 |
| 2014/0365258 A1* | 12/2014 | Vestal | G05D 1/0297 901/1 |
| 2015/0242769 A1* | 8/2015 | Kezeu | G06Q 50/265 705/7.11 |
| 2018/0137454 A1* | 5/2018 | Kulkarni | B64C 39/024 |
| 2019/0086928 A1* | 3/2019 | Chen | G01C 21/3602 |
| 2021/0103296 A1* | 4/2021 | Lee | G05D 1/101 |

* cited by examiner

*Primary Examiner* — Ramsey Refai
(74) *Attorney, Agent, or Firm* — Eversheds Sutherland (US) LLP

(57) ABSTRACT

Aspects described herein include an autonomous surface vehicle (ASV) for operation within an inventory system of an environment. The ASV includes a drive system, a docking system, a plurality of sensors, and a memory storing a map of the environment. The ASV further includes one or more computer processors configured to (i) detect, using a location sensor, a location of the ASV within the environment; (ii) control the drive system to actuate the ASV toward a corridor defined in the map at a first speed setting; and control the drive system to actuate the ASV through the corridor along at least one barrier defined in the map. A second, greater speed setting is applied when (i) the location sensor indicates that the ASV is within the corridor and (ii) one or more fiducials along the at least one barrier are visually detected by one or more proximity sensors.

20 Claims, 11 Drawing Sheets

INVENTORY SYSTEM WITH HIGH-SPEED CORRIDORS FOR AUTONOMOUS SURFACE VEHICLES

BACKGROUND

The present disclosure relates to operation of autonomous surface vehicles (ASVs) within an inventory system, and more specifically, to defining virtual corridors within the inventory system to support safe, high-speed operation of the ASVs.

To reduce the risk of collisions within the inventory system, a sensor-enabled ASV may establish a protective field in a forward direction, relative to a direction of motion of the ASV. The size of the protective field (sometimes referred to as a "safety bubble") may scale with the speed of the ASV to provide adequate time for the ASV to slow and/or maneuver when an obstacle is detected. The protective field may also extend to lateral direction(s) of the ASV to avoid intersection collisions with moving obstacles. In some cases, use of the protective field tends to cause overly conservative motion of the ASV (e.g., slow or stopped travel in crowded or constrained spaces) to ensure safe operation of the inventory system.

DETAILED DESCRIPTION

Embodiments described herein include an autonomous surface vehicle (ASV) for operation within an inventory system of an environment. The ASV comprises a drive system, a docking system configured to engage and transport an inventory holder through the environment, a plurality of sensors comprising a location sensor and one or more proximity sensors, and a memory storing a map of the environment. The ASV further comprises one or more computer processors configured to detect, using the location sensor, a location of the ASV within the environment. The one or more computer processors are further configured to control the drive system to actuate the ASV from the location toward a corridor defined in the map. A first speed setting is applied while actuating the ASV toward the corridor. The one or more computer processors are further configured to control the drive system to actuate the ASV through the corridor along at least one barrier defined in the map. A second speed setting greater than the first speed setting is applied when (i) the location sensor indicates that the ASV is within the corridor and (ii) one or more fiducials along the at least one barrier are visually detected by the one or more proximity sensors.

In some embodiments, the at least one barrier comprises a virtual barrier defined in the map. In some embodiments, the at least one barrier comprises a physical barrier that restricts entry of obstacles into the corridor. Based on the characteristics of the barrier(s), the corridor may provide different levels of assurance that obstacles will be prevented from dynamically crossing into the corridor. For example, a corridor bounded by two opposing walls may provide greater assurance than a corridor bounded by a single wall. In this way, the speed settings for the ASV may be greater for the two-walled corridor than the single-wall corridor.

Further, because the higher-speed operation of the ASV in the corridor depends on the continued presence of barrier(s), the sensor signals from the location sensor and the proximity sensor(s) may be used to prevent false positives. A first signal from the location sensor indicates that the ASV is located at or near the corridor (that is, along a barrier) and ready for transition to higher-speed operation. In some cases, the ASV may be slowed on approach to the corridor. A second signal from the proximity sensor indicates that the barrier(s) are detected, e.g., using markers or other fiducials on the barrier(s). The ASV is transitioned into the higher-speed operation responsive to detecting the first signal and the second signal, and remains in higher-speed operation so long as the first signal and the second signal continue to be detected. If the first signal and/or the second signal is lost (e.g., a timeout after a predetermined time period), the ASV is transitioned out of the higher-speed operation (e.g., returned to default speed settings).

Figure 1:
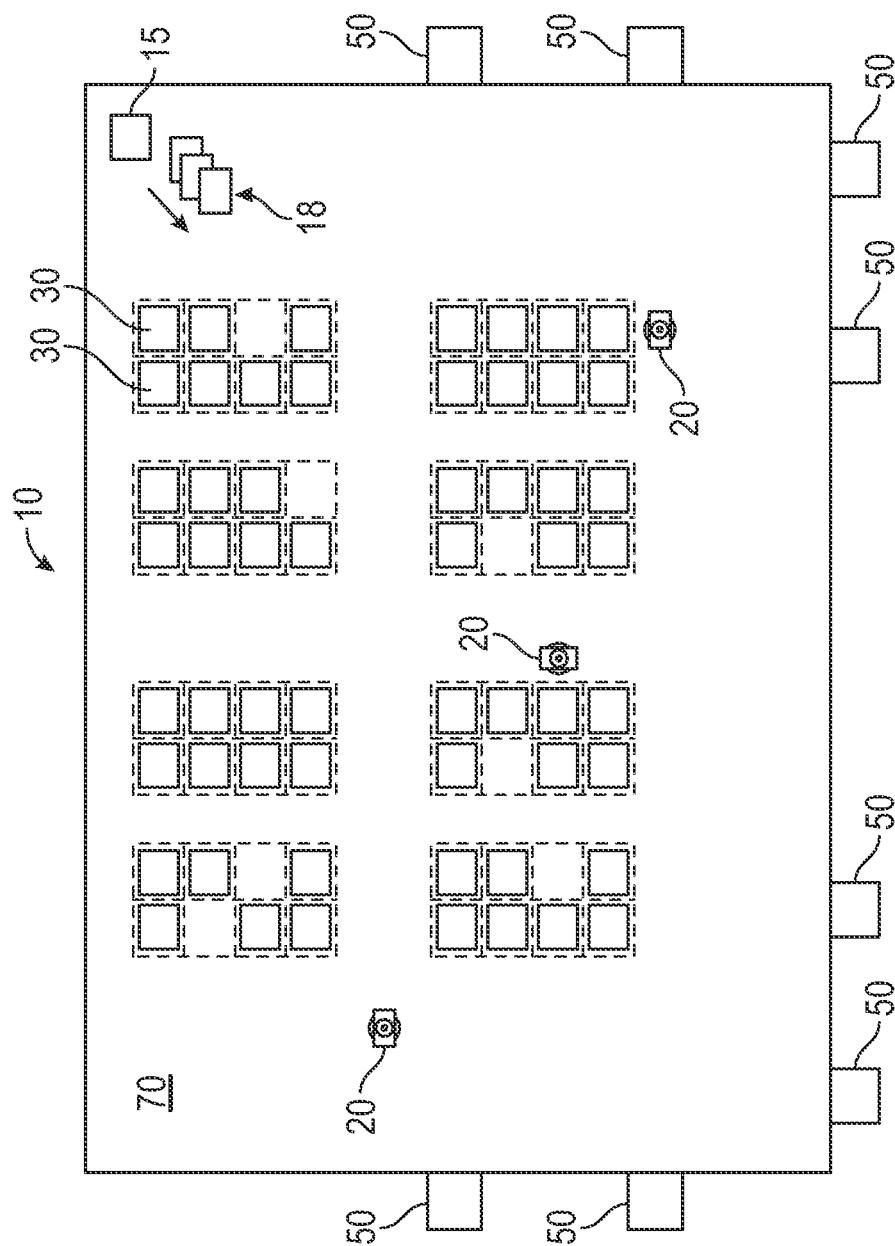
FIG. 1 is a diagram of an inventory system, according to one or more embodiments.

FIG. 1 is a diagram of an inventory system 10, according to one or more embodiments. The inventory system 10 includes a controller 15, one or more autonomous surface vehicles (ASVs) 20, one or more inventory holders 30, and one or more inventory stations 50.

Each ASV 20 transports the inventory holders 30 between locations within a workspace 70 in response to commands communicated by the controller 15. Each inventory holder 30 is dimensioned to store one or more types of inventory items. In some cases, fiducials may be placed on the floor of the workspace 70 to demarcate different regions, such as different functional regions, within the workspace 70, and/or to provide navigational references for the ASV 20. The inventory system 10 is capable of moving inventory items between locations within the workspace 70 to facilitate the entry, processing, and/or removal of inventory items from the inventory system 10 and the completion of other tasks involving inventory items.

The controller 15 assigns tasks to appropriate components of the inventory system 10, and coordinates operation of the various components in completing the tasks. These tasks may relate not only to the movement and processing of inventory items, but also to the management and maintenance of the components of the inventory system 10. For example, the controller 15 may assign portions of the workspace 70 for "parking" the ASVs 20, for recharging and/or replacing batteries of the ASVs 20, the storage of empty inventory holders 30, or any other operations associated with the functionality supported by the inventory system 10 and its various components. The controller 15 may select components of the inventory system 10 to perform these tasks and communicate appropriate commands and/or data to the selected components to facilitate completion of these operations. Although shown in FIG. 1 as a single, discrete component, the controller 15 may represent multiple components and may represent or include portions of the ASVs 20 and/or other elements of the inventory system 10. As a result, any or all of the interaction(s) between a particular ASV 20 and the controller 15 that is described below may, in particular embodiments, represent peer-to-peer communication between different ASVs 20.

The ASVs 20 move the inventory holders 30 between locations within the workspace 70. The ASVs 20 may represent any devices or components appropriate for use in the inventory system 10 based on the characteristics and configuration of the inventory holders 30 and/or other elements of the inventory system 10. In a particular embodiment of the inventory system 10, the ASVs 20 represent independent, self-powered devices configured to freely move about the workspace 70. In alternative embodiments, the ASVs 20 represent elements of a tracked inventory system configured to move the inventory holders 30 along tracks, rails, cables, crane system, or other guidance or support elements traversing the workspace 70. In such an embodiment, the ASVs 20 may receive power and/or support through a connection to the guidance elements, such as a powered rail. Additionally, in particular embodiments of the inventory system 10, the ASVs 20 may be configured to use alternative conveyance equipment to move within the workspace 70 and/or between separate portions of the workspace 70. The contents and operation of an example embodiment of the ASVs 20 are discussed further below with respect to FIGS. 2A and 2B.

Additionally, the ASVs 20 may be capable of communicating with the controller 15 to receive information identifying selected inventory holders 30, to transmit the locations of the ASVs 20, to transmit image data for images of fiducials captured by the ASVs, and/or to exchange any other suitable information to be used by the controller 15 or the ASVs 20 during operation.

The ASVs 20 may communicate with the controller 15 wirelessly, using wired connections between the ASVs 20 and the controller 15, and/or in any other appropriate manner. As one example, particular embodiments of the ASVs 20 may communicate with the controller 15 and/or with one another using IEEE 802.11, Bluetooth, or Infrared Data Association (IrDA) standards, or any other appropriate wireless communication protocol. As another example, in a tracked implementation of the inventory system 10, tracks or other guidance elements upon which the ASVs 20 move may be wired to facilitate communication between the ASVs 20 and other components of the inventory system 10. Furthermore, as noted above, the controller 15 may include components of the individual ASVs 20. Thus, for the purposes of this description and the claims that follow, communication between the controller 15 and a particular ASV 20 may represent communication between components of the particular ASV 20. In general, the ASVs 20 may be powered, propelled, and controlled in any manner appropriate based on the configuration and characteristics of the inventory system 10.

Each of the inventory holders 30 store inventory items of the inventory system 10. In a particular embodiment, the inventory holders 30 include multiple storage bins with each storage bin capable of holding one or more types of inventory items. The inventory holders 30 are capable of being carried, rolled, and/or otherwise moved by the ASVs 20. In particular embodiments, the inventory holders 30 may provide additional propulsion to supplement the propulsion provided by the ASV 20 when moving one of the inventory holders 30.

Additionally, in particular embodiments, the inventory items may also be suspended from hooks or bars (not shown) within or on the inventory holders 30. In general, the inventory holders 30 may store inventory items in any appropriate manner within the inventory holders 30 and/or on the external surface of the inventory holders 30.

Additionally, each of the inventory holders 30 may include a plurality of faces, and each storage bin may be accessible through one or more faces of the inventory holders 30. For example, in a particular embodiment, each of the inventory holders 30 includes four faces. In such an embodiment, storage bins located at a corner of two faces may be accessible through either of those two faces, while each of the other storage bins is accessible through an opening in one of the four faces. The ASVs 20 may be configured to rotate the inventory holders 30 at appropriate times to present a particular face and the storage bins associated with that face to an operator or to other components of the inventory system 10.

The inventory items represent any objects suitable for storage, retrieval, and/or processing in the inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail-order warehouse facility, and inventory items may represent merchandise stored in the mail-order warehouse facility. During operation, the ASVs 20 may retrieve the inventory holders 30 containing one or more inventory items that are requested in an order to be packed for delivery to a customer, or to inventory holders 30 carrying pallets containing aggregated collections of inventory items for shipment. Moreover, in particular embodiments of the inventory system 10, boxes containing completed orders may themselves represent inventory items.

The inventory system 10 may also include one or more inventory stations 50. In some embodiments, each of the one or more inventory stations 50 represents a location at which the inventory system 10 is externally accessible by human operator(s) and/or robotic system(s) external to the inventory system 10. In some embodiments, the workspace 70 may be externally bounded by walls or a fence to prevent or limit access to the workspace 70 by human operator(s) (e.g., a structured environment), and each of the inventory stations 50 is arranged at a respective opening in the walls or fence. In other embodiments, the workspace 70 is not externally bounded (e.g., an unstructured environment). In some embodiments, the inventory system 10 is configured so that both ASVs 20 and human operator(s) may navigate through the workspace 70 and interact with various components of the inventory system 10.

The inventory stations 50 represent locations designated for the completion of particular tasks involving inventory items. Such tasks may include the removal of inventory items from the inventory holders 30, the introduction of inventory items into the inventory holders 30, the counting of inventory items in the inventory holders 30, the decomposition of inventory items (e.g., separating from pallet-sized or case-sized groups into individual inventory items), the consolidation of inventory items between the inventory holders 30, and/or the processing or handling of inventory items in any other suitable manner. In particular embodiments, the inventory stations 50 may represent the mere physical locations where particular task(s) involving inventory items can be completed within the workspace 70. In alternate embodiments, the inventory stations 50 may represent both the physical location and also any appropriate equipment for processing or handling inventory items, such as scanners for monitoring the flow of inventory items in and out of the inventory system 10, communication interfaces for communicating with the controller 15, and/or any other suitable components. The inventory stations 50 may be controlled, entirely or in part, by human operator(s) or may be fully automated. Moreover, the human or automated operator(s) of the inventory stations 50 may be capable of performing certain tasks to inventory items, such as packing, counting, or transferring inventory items, as part of the operation of the inventory system 10.

The workspace 70 represents an area associated with the inventory system 10 in which the ASVs 20 can move and/or the inventory holders 30 can be stored. For example, the workspace 70 may represent all or part of the floor of a mail-order warehouse in which the inventory system 10 operates. Although FIG. 1 shows, for the purposes of illustration, an embodiment of the inventory system 10 in which the workspace 70 includes a fixed, predetermined, and finite physical space, particular embodiments of the inventory system 10 may include ASVs 20 and inventory holders 30 that are configured to operate within a workspace 70 that is of variable dimensions and/or of an arbitrary geometry. While FIG. 1 illustrates a particular embodiment of the inventory system 10 in which the workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, the controller 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the ASVs 20, the inventory holders 30, the inventory stations 50, and other components of the inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, the controller 15 generates the task assignments 18 based, in part, on inventory requests that the controller 15 receives from other components of the inventory system 10 and/or from external components in communication with the controller 15. These inventory requests identify particular operations to be completed involving inventory items stored or to be stored within the inventory system 10 and may represent communication of any suitable form. For example, in particular embodiments, an inventory request may represent a shipping order specifying particular inventory items that have been purchased by a customer and that are to be retrieved from the inventory system 10 for packaging and shipment to the customer. The controller 15 may also generate task assignments 18 independently of such inventory requests, as part of the overall management and maintenance of the inventory system 10. For example, the controller 15 may generate task assignments 18 in response to the occurrence of a particular event (e.g., in response to an ASV 20 requesting a space to park, a revision of the workspace 70 including installation and/or removal of fiducial markers onto a portion of the revised workspace 70), according to a predetermined schedule (e.g., as part of a daily start-up routine), or at any appropriate time based on the configuration and characteristics of the inventory system 10. After generating one or more task assignments 18, the controller 15 transmits the generated task assignments 18 to appropriate components for completion of the corresponding task. The relevant components then execute their assigned tasks.

With respect to the ASVs 20 specifically, the controller 15 may, in particular embodiments, communicate task assignments 18 to selected ASVs 20 that identify one or more destinations for the selected ASVs 20. The controller 15 may select an ASV 20 to assign the relevant task based on the location or state of the selected ASV 20, an indication that the selected ASV 20 has completed a previously-assigned task, a predetermined schedule, and/or any other suitable consideration. These destinations may be associated with an inventory request that the controller 15 is executing or a management objective that the controller 15 is attempting to fulfill. For example, the task assignment may define the location of an inventory holder 30 to be retrieved, an inventory station 50 to be visited, a storage location where the ASV 20 should park until receiving another task, or a location associated with any other task appropriate based on the configuration, characteristics, and/or state of the inventory system 10, as a whole, or individual components of the inventory system 10. For example, in particular embodiments, such decisions may be based on the popularity of particular inventory items, the staffing of a particular inventory station 50, the tasks currently assigned to an ASV 20, and/or any other appropriate considerations.

As part of completing these tasks, the ASVs 20 may dock with and transport inventory holders 30 within the workspace 70. The ASVs 20 may dock with inventory holders 30 by connecting to, lifting, and/or otherwise interacting with the inventory holders 30 in any other suitable manner so that, when docked, the ASV 20 is coupled to and/or supports the inventory holder 30 and can move the inventory holder 30 within the workspace 70. While the description below focuses on particular embodiments of the ASV 20 and the inventory holder 30 that are configured to dock in a particular manner, alternative embodiments of the ASV 20 and the inventory holder 30 may be configured to dock in any manner suitable to allow the ASV 20 to move an inventory holder 30 within the workspace 70. Additionally, as noted below, in particular embodiments, the ASVs 20 represent all or portions of the inventory holders 30. In such embodiments, the ASVs 20 may not dock with the inventory holders 30 before transporting the inventory holders 30 and/or the ASVs 20 may each remain continually docked with a particular inventory holder 30.

While the appropriate components of the inventory system 10 complete assigned tasks, the controller 15 may interact with relevant components of the inventory system 10 to ensure the efficient use of space, equipment, manpower, and other resources available to the inventory system 10. As one specific example of such interaction, the controller 15 is responsible, in particular embodiments, for planning the paths that the ASVs 20 take when moving within the workspace 70 and for allocating use of a particular portion of the workspace 70 to a particular ASV 20 for purposes of completing an assigned task. In such embodiments, the ASVs 20 may, in response to being assigned a task, request a path to a particular destination associated with the task. Moreover, while the description below focuses on one or more embodiments in which the ASV 20 requests paths from the controller 15, the ASV 20 may, in alternative embodiments, generate its own paths to complete an assigned task.

Components of the inventory system 10 may provide information to the controller 15 regarding their current state, other components of the inventory system 10 with which they are interacting, and/or other conditions relevant to the operation of the inventory system 10. This may allow the controller 15 to utilize feedback from the relevant components to update algorithm parameters, adjust policies, or otherwise modify its decision-making to respond to changes in operating conditions or the occurrence of particular events.

In addition, while the controller 15 may be configured to manage various aspects of the operation of the components of the inventory system 10, in particular embodiments, the components themselves may also be responsible for decision-making relating to certain aspects of their operation, thereby reducing the processing load on the controller 15.

Thus, based on its knowledge of the location, current state, and/or other characteristics of the various components of the inventory system 10 and an awareness of all the tasks currently being completed, the controller 15 can generate task assignments 18, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 10 may be able to support a number of techniques for efficiently executing various aspects of the operation of the inventory system 10. As a result, particular embodiments of the controller 15 may, by implementing one or more management techniques described below, enhance the efficiency of the inventory system 10 and/or provide other operational benefits.

Figure 2A:
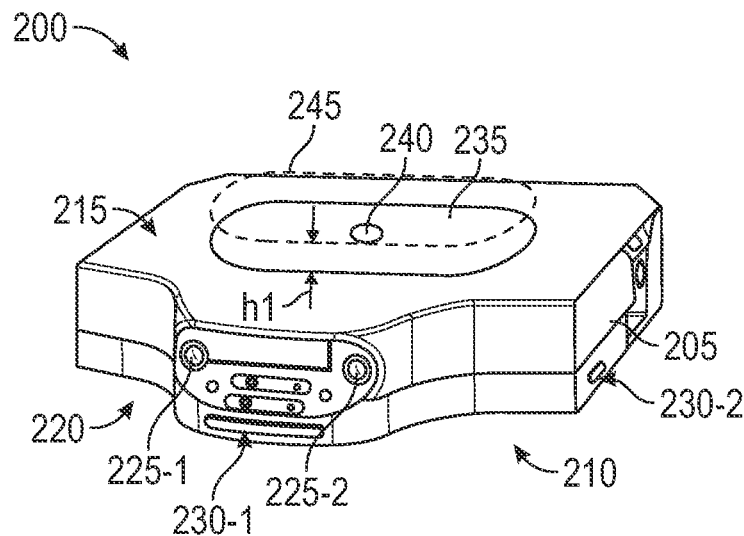
FIG. 2A is a perspective view of an autonomous surface vehicle, according to one or more embodiments.
Figure 2B:
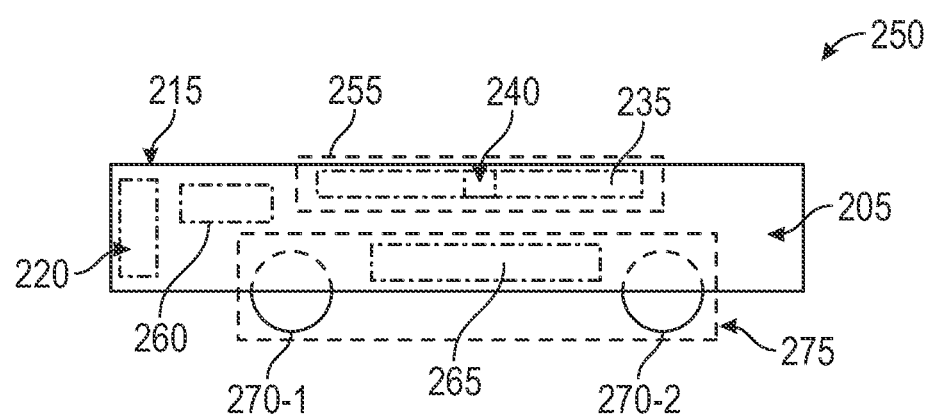
FIG. 2B is a side view of an autonomous surface vehicle, according to one or more embodiments.

FIG. 2A is a perspective view, and FIG. 2B is a side view 250, of an ASV 200, according to one or more embodiments. The features illustrated in FIGS. 2A and 2B may be used in conjunction with other embodiments. For example, the ASV 200 may represent one possible implementation of the ASV 20 of FIG. 1.

The ASV 200 comprises a body 205 dimensioned to house various components and/or systems of the ASV 200. In some embodiments, the body 205 forms a waterproof or other protective enclosure for the components and/or systems. The body 205 may be formed of one or more housing components of any suitable materials. For example, the body 205 may be formed of a thermoplastic polymer (e.g., nylon) that is both durable and light weight.

As shown in FIGS. 2A and 2B, the body 205 houses a forward panel 220, a controller 260, a drive system 275, and a docking system 255. Although not shown, the body 205 may further house a power storage device (e.g., a battery) that provides electrical power to the forward panel 220, the controller 260, the drive system 275, and the docking system 255. The controller 260 comprises one or more computer processors (also referred to as processors) and a memory. The one or more computer processors may be implemented in any suitable form, such as a general purpose microprocessor, a controller, an application-specific integrated circuit (ASIC), and so forth. The memory may include a variety of computer-readable media selected for their size, relative performance, or other capabilities: volatile and/or non-volatile media, removable and/or non-removable media, etc.

The forward panel 220 faces a forward direction of motion of the ASV 200. The forward panel 220 comprises a plurality of sensors 225-1, 225-2 and an indicator light 230-1. The sensors 225-1, 225-2 may have any suitable implementation, such as visual sensors (e.g., cameras), ranging sensors (e.g., radar, lidar), proximity sensors, and so forth. In some embodiments, the sensors 225-1, 225-2 are stereo cameras configured to detect obstacles, physical barriers, fiducials, and/or other ASVs 200 within the environment. Other types of sensors may be included in the ASV 200, such as inertial sensors, navigational sensors, and so forth. In some embodiments, the ASV 200 may include sensors with different positions and/or orientations.

The controller 260 receives sensor signals from the sensors 225-1, 225-2 and performs processing on the sensor signals. For example, the computer processor(s) of the controller 260 may perform image processing to detect obstacles, physical barriers, and/or fiducials.

The controller 260 generates one or more control signals for the drive system 275 to actuate the ASV 200 over a reference surface 210, such as a floor of the environment. The one or more control signals for the drive system 275 are based at least in part on the sensor signals from the sensors 225-1, 225-2. In some embodiments, the controller 260 further receives sensor signals from a navigational sensor (which may be implemented in the ASV 200 or in an external computing device) and the one or more control signals for the drive system 275 are further based on the sensor signals from the navigational sensor.

The drive system 275 comprises a powertrain 265 (e.g., electric motor(s) and drivetrain components) and wheels 270-1, 270-2. Although not shown in FIG. 2B, the ASV 200 may include additional wheels that are axially aligned with the wheels 270-1, 270-2. In some embodiments, the ASV 200 uses differential steering to turn the ASV 200 without turning the wheels 270-1, 270-2. For example, the ASV 200 may be able to perform neutral turns by rotating, within a pair of axially-aligned wheels, one wheel in a forward direction and the other wheel in a reverse direction. Further, in some embodiments, the ASV 200 may include one or more stabilizer wheels that are not driven by the drive system 275.

The controller 260 selectively illuminates the indicator light 230-1 of the forward panel 220, as well as any other indicator lights of the ASV 200 such as an indicator light 230-2 arranged at a lateral side of the body 205. The indicator lights 230-1, 230-2 may be configured to convey any suitable information to human operators collocated within the environment. For example, the controller 260 may operate the indicator lights 230-1, 230-2 to indicate that the ASV 200 is moving, a direction that the ASV 200 is moving, how fast the ASV 200 is moving, a state of the power storage device (e.g., a charge state, whether the power storage device is charging), whether the ASV 200 is engaged with an inventory holder, whether the ASV 200 detects an obstacle, a physical barrier, and/or a fiducial, and so forth.

Further, the controller 260 may illuminate the indicator lights 230-1, 230-2 in any manner suitable to convey the different information. For example, the controller 260 may control the colors displayed by the indicator lights 230-1, 230-2, illumination patterns, and so forth.

The controller 260 generates one or more control signals for the docking system 255, which engages and transports inventory holders (e.g., the inventory holders 30 of FIG. 1) through the environment. The docking system 255 comprises a docking interface 235, an actuator (not shown) operatively connected with the docking interface 235, and a docking sensor 240.

In some embodiments, the docking interface 235 couples the ASV 200 to an inventory holder 30 and/or supports the inventory holder 30 when the ASV 200 is docked to the inventory holder 30. The docking interface 235 may additionally allow the ASV 200 to maneuver the inventory holder 30, such as by lifting the inventory holder 30, propelling the inventory holder 30, rotating the inventory holder 30, and/or moving the inventory holder 30 in any other appropriate manner. The docking interface 235 may also include any appropriate combination of components, such as ribs, spikes, and/or corrugations, to facilitate such manipulation of the inventory holder 30. For example, in particular embodiments, the docking interface 235 may include a high-friction portion that abuts a portion of the inventory holder 30 while the ASV 200 is docked to the inventory holder 30. In such embodiments, frictional forces created between the high-friction portion of the docking interface 235 and a surface of the inventory holder 30 may induce translational and rotational movement in the inventory holder 30 when the docking interface 235 moves and rotates, respectively. As a result, the ASV 200 may be able to manipulate the inventory holder 30 by moving or rotating the docking interface 235, either independently or as a part of the movement of the ASV 200 a whole.

The actuator moves the docking interface 235 towards the inventory holder 30 to facilitate docking of the ASV 200 and the inventory holder 30. The actuator may also be capable of adjusting the position or orientation of the docking interface 235 in other suitable manners to facilitate docking. The actuator may include any appropriate components, based on the configuration of the ASV 200 and the inventory holder 30, for moving the docking interface 235 or otherwise adjusting the position and/or orientation of the docking interface 235. For example, the actuator may include a motorized shaft attached to the center of the docking interface 235. The motorized shaft is operable to elevate or lower the docking interface 235 as appropriate for docking with the inventory holder 30. For example, the actuator raises the docking interface 235 to an elevated position 245 at a first height h1 to engage and support the inventory holder 30. In some embodiments, in a retracted position, the docking interface 235 forms a continuous surface with the top surface 215.

The docking sensor 240 represents one or more sensors, detectors, or other components suitable for detecting an inventory holder 30 and/or determining, in any appropriate manner, the location of an inventory holder 30, as an absolute location or as a position relative to the ASV 200. The docking sensor 240 may be capable of detecting the location of a particular portion of an inventory holder 30 or an inventory holder 30 as a whole. The ASV 200 may then use the detected information for docking with or otherwise interacting with an inventory holder 30. The docking sensor 240 may have any suitable arrangement, such as embedded in the docking interface 235, embedded in the body 205 at the top surface 215, housed in the body 205, and so forth.

While FIGS. 2A and 2B illustrate a particular embodiment of the ASV 200 containing certain components and configured to operate in a particular manner, the ASV 200 may represent any appropriate component and/or collection of components configured to transport and/or facilitate the transport of the inventory holders 30. As another example, the ASV 200 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in particular embodiments, the ASV 200 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such embodiments, the ASV 200 may represent the responsive portion of the inventory holder 30 and/or the components of the inventory system 10 responsible for generating and controlling these magnetic fields. While this description provides several specific examples, the ASV 200 may, in general, represent any appropriate component and/or collection of components configured to transport and/or facilitate the transport of the inventory holders 30.

Figure 3A:
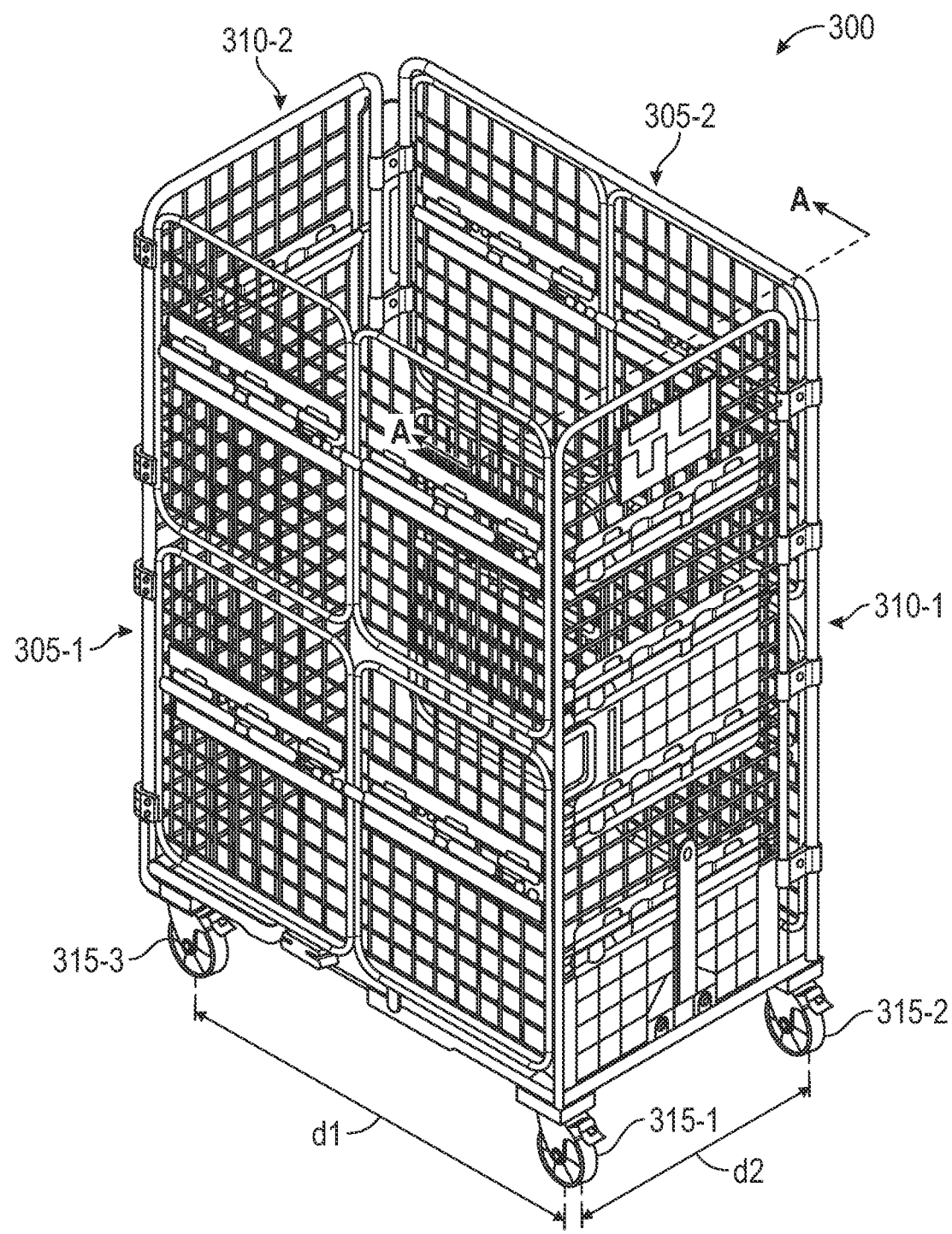
FIG. 3A is a perspective view of an inventory holder, according to one or more embodiments.
Figure 3B:
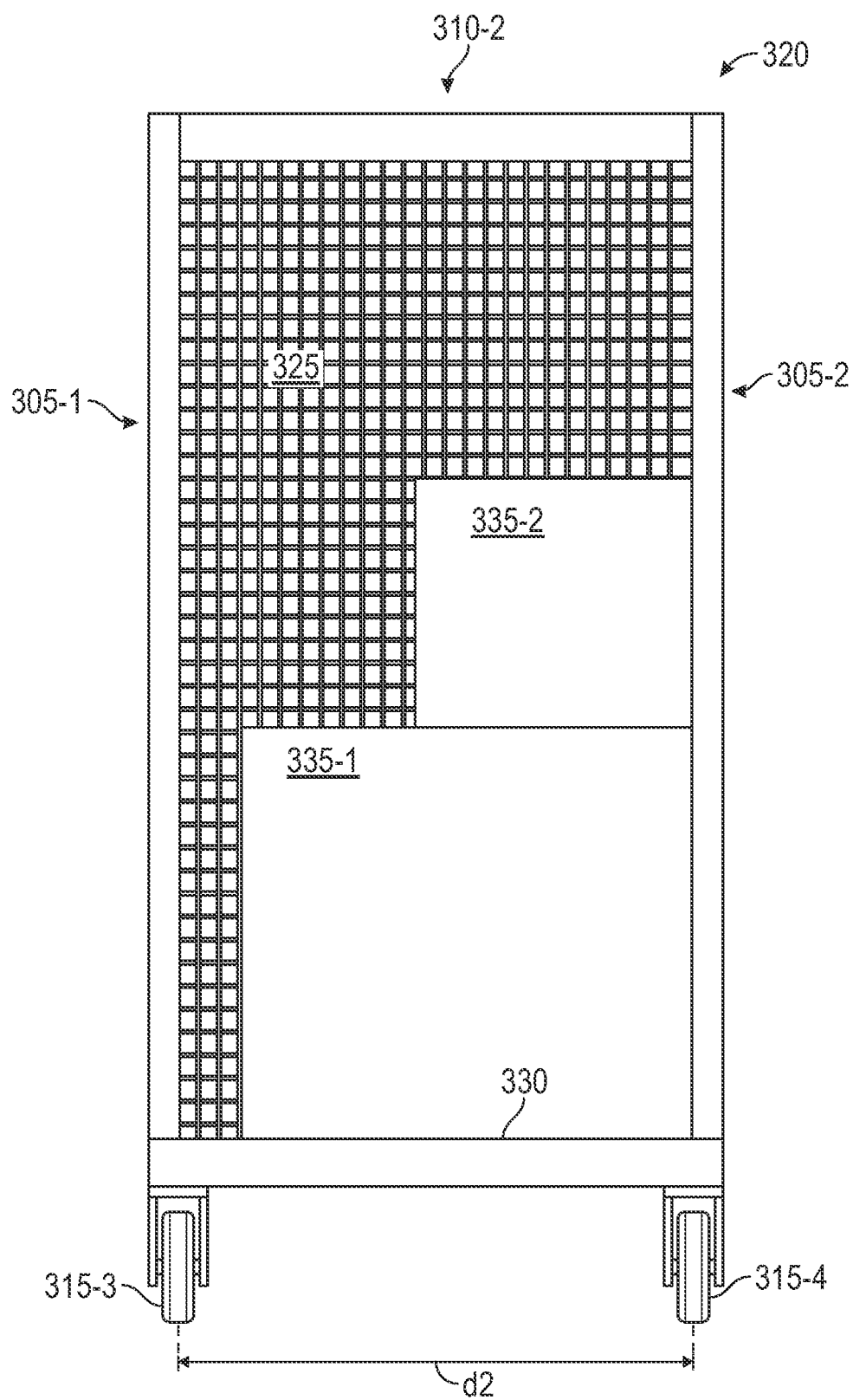
FIG. 3B is a cross-section view of an inventory holder, according to one or more embodiments.

FIG. 3A is a perspective view, and FIG. 3B is a cross-section view 320, of an inventory holder 300, according to one or more embodiments. The features illustrated in FIGS. 3A and 3B may be used in conjunction with other embodiments. For example, the inventory holder 300 may represent one possible implementation of the inventory holder 30 of FIG. 1.

The inventory holder 300 comprises opposing sidewalls 305-1, 305-2 and opposing doors 310-1, 310-2. The sidewalls 305-1, 305-2 and doors 310-1, 310-2 contact a deck 330 that defines a lower surface of the inventory holder 300. The sidewalls 305-1, 305-2, the doors 310-1, 310-2, and the deck 330 collectively define an interior volume 325 that provides one or more compartments for inserting, storing, and/or removing inventory items. The doors 310-1, 310-2 may be pivotably attached to the sidewalls 305-1, 305-2 and/or the deck 330, such that the doors 310-1, 310-2 may be rotated between open and closed positions to access the interior volume 325.

The sidewalls 305-1, 305-2 and the doors 310-1, 310-2 may have any suitable implementation and may be formed of any suitable materials having sufficient strength for storing and/or transporting inventory items. In some embodiments, the sidewalls 305-1, 305-2 and the doors 310-1, 310-2 are wireframe construction and formed of a metal such as steel. In other embodiments, the sidewalls 305-1, 305-2 and the doors 310-1, 310-2 may have solid surfaces.

One or more shelves and/or dividers (not shown) may be arranged in the interior volume 325, e.g., attached to and extending between the sidewalls 305-1, 305-2, to define different compartments within the interior volume 325. As shown, parcels 335-1, 335-2 are stored in a single compartment of the interior volume 325 and supported by the deck 330.

A plurality of wheels 315-1, 315-2, 315-3, 315-4 attach to the deck 330, e.g., at the lower surface of the inventory holder 300. In some embodiments, at least some of the wheels 315-1, 315-2, 315-3, 315-4 comprise casters that can swivel as the inventory holder 300 is moved through the environment. Thus, the inventory holder 300 may be moved through the environment by at least two methods: rolling when being pushed by human operator(s), and by lifting and carrying the inventory holder 300, e.g., using the ASV 200 of FIG. 2.

The wheels 315-1, 315-3 and the wheels 315-2, 315-4 are separated by a first distance d1, and the wheels 315-1, 315-2 and the wheels 315-3, 315-4 are separated by a second distance d2. One or both of the distances d1, d2 are selected to allow the ASV 200 to drive in and out from positions beneath the inventory holder 300.

Figure 4B:
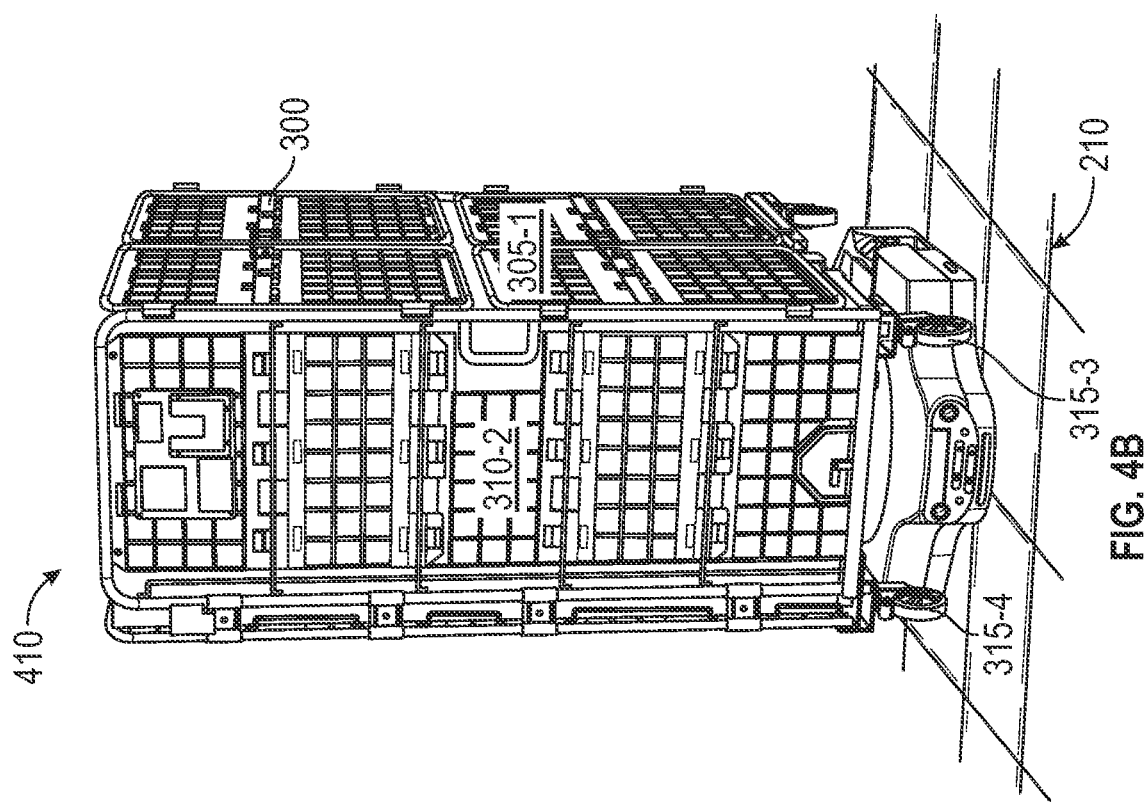
FIG. 4B is a perspective view of an autonomous surface vehicle engaged with an inventory holder elevated above a reference surface, according to one or more embodiments.
Figure 4A:
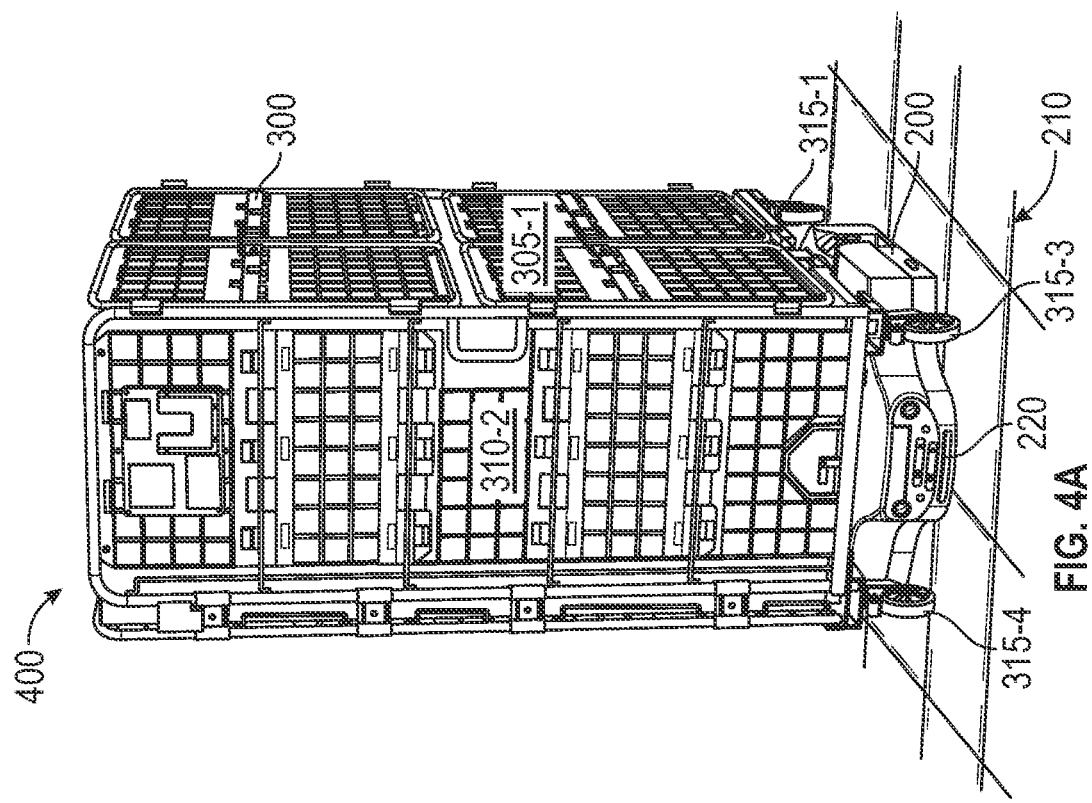
FIG. 4A is a perspective view of an autonomous surface vehicle engaged with an inventory holder contacting a reference surface, according to one or more embodiments.

FIG. 4A is a perspective view 400 of the ASV 200 engaged with the inventory holder 300 contacting the reference surface 210, according to one or more embodiments. FIG. 4B is a perspective view 410 of the ASV 200 engaged with the inventory holder 300 elevated above the reference surface 210, according to one or more embodiments. In the view 400, the wheels 315-1, 315-2, 315-3, 315-4 of the inventory holder 300 are contacting the reference surface 210. The ASV 200 is positioned beneath the inventory holder 300 such that the forward panel 220 is arranged between the wheels 315-3, 315-4.

The docking interface of the ASV 200 is raised by the actuator to cause the inventory holder 300 to be elevated. In the view 410, the docking interface is raised to a height such that the wheels 315-1, 315-2, 315-3, 315-4 of the inventory holder 300 are elevated above the reference surface 210. From this configuration, the ASV 200 may transport and/or reorient the inventory holder 300 within the environment.

Figure 5:
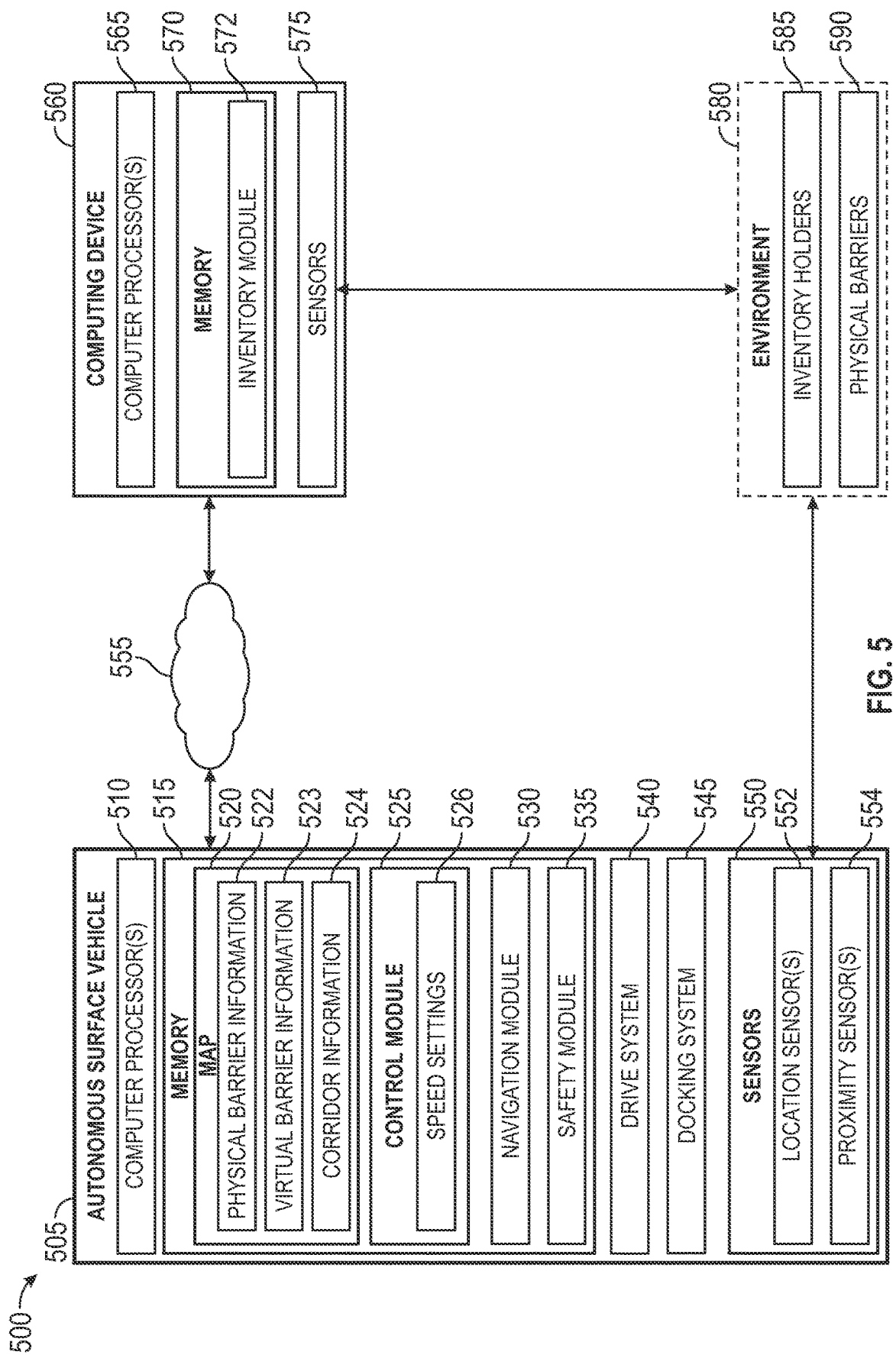
FIG. 5 is a system diagram of an inventory system, according to one or more embodiments.

FIG. 5 is a diagram of an inventory system 500, according to one or more embodiments. The features illustrated in FIG. 5 may be used in conjunction with other embodiments. For example, the inventory system 500 may be one possible implementation of the inventory system 10 of FIG. 1.

The inventory system 500 comprises an ASV 505 communicatively coupled with a computing device 560 via a network 555. In some embodiments, the ASV 505 is implemented within an environment 580, and the computing device 560 may be implemented within, or proximate to, the environment 580. For example, the computing device 560 may be considered proximate to the environment 580 so long as the computing device 560 is within communication range with the ASV 505 and/or within sensing range of the environment 580. The environment 580 may be implemented as any suitable type, such as an industrial environment, a commercial environment, or a residential environment. In some cases, the environment 580 may represent one example of the workspace 70 of FIG. 1.

The environment 580 comprises one or more inventory holders 585 (e.g., one or more instances of the inventory holders 300 of FIG. 3). The environment 580 further comprises one or more physical barriers 590 representing regions of the environment 580 that restrict obstacles from dynamically crossing into a path of the ASV 505. The one or more physical barriers 590 may be substantially permanent (e.g., an installed wall or fence without gates, doors, or other openings) or semi-permanent (e.g., a movable room divider) structures in the environment 580. Further, some or all of the physical barrier(s) 590 may be defined as different sections of a larger structure (e.g., sections of a wall that are separated by a door or other opening).

The ASV 505 comprises one or more computer processors 510 (also referred to as processors 510) and a memory 515. The ASV 505 further comprises a drive system 540 (e.g., an instance of the drive system 275), a docking system 545 (e.g., an instance of the docking system 255), and a plurality of sensors 550. In some embodiments, the plurality of sensors 550 comprise one or more location sensors 552 that indicate a location of the ASV 505 in the environment 580, and one or more proximity sensors 554 that detect the one or more physical barriers 590, each of which may have any suitable implementation. Some examples of the locator sensor(s) 552 include a Global Positioning System (GPS) sensor, an inertial sensor, a visual sensor oriented to detect fiducials in the environment 580, and so forth. Some examples of the proximity sensor(s) 554 include radar sensors, lidar sensors, visual sensors, infrared sensors, capacitive or inductive sensors, Hall-effect sensors, and so forth. In some embodiments, the environment 580 includes fiducials or other target objects (e.g., metal) that are capable of being sensed by the proximity sensor(s) 554.

In some embodiments, the processors 510 and the memory are implemented in the controller 260 of FIG. 2B, although alternate implementations may include one or more processors and/or a memory external to the controller 260. The one or more processors 510 may be implemented in any suitable form, such as a general purpose microprocessor, a controller, an application-specific integrated circuit (ASIC), and so forth. The memory 515 may include a variety of computer-readable media selected for their size, relative performance, or other capabilities: volatile and/or non-volatile media, removable and/or non-removable media, etc.

In some embodiments, the one or more processors 510 are communicatively connected with a network 555 representing one or more networks of any suitable types, such as the Internet, a local area network (LAN), a wide area network (WAN), and/or a wireless network. The communicative connections to the network 555 may have any suitable implementation, such as copper transmission cable(s), optical transmission fiber(s), wireless transmission, router(s), firewall(s), switch(es), gateway computer(s), and/or edge server(s).

The memory 515 may include one or more modules for performing various functions described herein. In one embodiment, each module includes program code that is executable by the one or more processors 510. In another embodiment, each module is partially or fully implemented in hardware (i.e., circuitry) or firmware of the ASV 505 (e.g., as circuitry within the one or more processors 510). However, other embodiments of the inventory system 500 may include modules that are partially or fully implemented in other hardware or firmware, such as hardware or firmware included in one or more other computing devices connected with the network 555 (e.g., the computing device 560), and so forth. Stated another way, the overall functionality of the one or more modules may be distributed among other devices. As shown, the memory 515 comprises a control module 525, a navigation module 530, and a safety module 535, although different combinations of the functionality described herein are also contemplated.

The computing device 560 may be implemented in any suitable form. In some embodiments, the computing device 560 represents an instance of the controller 15 of FIG. 1. As shown, the computing device 560 comprises one or more computer processors 565 and a memory 570, which may be configured similarly to the one or more computer processors 510 and the memory 515 of the ASV 505. The computing device 560 further comprises one or more sensors 575, such as visual sensors. In some embodiments, the one or more sensors 575 may be used to determine locations of the ASV 505 and other components of the inventory system 500 such as the inventory holders 585.

The memory 570 comprises an inventory module 572 send control signals to perform operations for managing inventory within the environment 580, and/or the management and maintenance of components of the inventory system 500. For example, the control signals sent by the inventory module 572 may assign tasks to various components of the inventory system 500, such as assigning the ASV 505 to park or charge at a particular location, to engage or disengage an inventory holder 585, and so forth.

In some embodiments, the ASV 505 receives the control signals from the inventory module 572, and a navigation module 530 of the ASV 505 accesses a map 520 stored in the memory 515 as part of fulfilling the tasks, etc. included with the control signals. For example, the navigation module 530 may calculate an optimal (or efficient) route for the ASV 505 to follow through the environment 580 to a location specified by a task included in the control signals.

The map 520 represents some or all of features of the environment 580 that may be encountered by the ASV 505. In some embodiments, the map 520 comprises physical barrier information 522 that indicates location information for the physical barriers 590 within the environment 580. The map 520 may include additional information, such as type information for the physical barriers 590 (e.g., walls, movable room dividers, etc.). In some embodiments, the physical barriers 590 includes one or more dedicated lanes, such as tunnels. The dedicated lanes may have restricted access, such as gates that selectively admit the ASV 505 and/or other ASVs.

In some embodiments, the map 520 comprises virtual barrier information 523 that indicates location information for one or more virtual barriers (that is, existing in the map 520 but not physically present in the environment 580). The location of the virtual barrier(s) may be determined using any suitable techniques. For example, the location of the virtual barrier(s) may be determined using traffic of the ASV 505 and/or other ASVs, placement of other static and/or dynamic structures in the environment 580, movement of human associates in the environment 580, and so forth. In some embodiments, the traffic and/or placement information may be simulated or estimated, e.g., based on a simulated or estimated operation of an inventory system. In some embodiments, the traffic and/or placement information may be based on historical operational data for the inventory system. In some cases, the virtual barrier(s) may be defined in regions of the environment 580 having less traffic (whether actual or estimated).

In some embodiments, the map 520 further comprises corridor information 524 that defines virtual "corridors" in the environment 580 within which the ASV 505 is permitted and/or controlled to travel at greater speeds. In some embodiments, each of the corridors is referenced to one or more of the physical barriers 590 and/or to one or more virtual barriers.

The corridors may have any suitable dimensioning, and may have different types. In some embodiments, the corridors are linear although corridors having curved portions, corners, etc. are also contemplated. In one example, a first type of corridor is bounded along a single side by a wall or other physical barrier 590. In another example, a second type of corridor is bounded along both sides by walls or other physical barriers 590. In some embodiments, the ASV 505 is operated at different speeds based on the type of corridor. The different speeds may be selected based on the relative levels of assurance that the physical barriers 590 provide to prevent obstacles from dynamically crossing into the corridor. In some embodiments, the ASV 505 is operated at a first (maximum) speed within the first type of corridor, and the ASV 505 is operated at a second (maximum) speed within the second type of corridor. The second speed is greater than the first speed, as bounding the corridor along both sides provides a greater assurance of preventing obstacles than bounding the corridor along only one side.

In some embodiments, the navigation module 530 calculates the optimal route for the ASV 505 using the corridor information 524 (e.g., considering the different speeds that are permitted). The navigation module 530 may also consider the location and/or movement of other ASVs, obstacles, etc. within the environment 580 when calculating the optimal route.

In some embodiments, a control module 525 receives the optimal route from the navigation module 530 and generates control signals for the drive system 540 and/or the docking system 545. In some embodiments, the control module 525 includes one or more speed settings 526 for the drive system 540 that are included in the control signals. The one or more speed settings 526 may differ as the ASV 505 travels along the route. The speed settings 526 may be represented in any suitable form.

Figure 7:
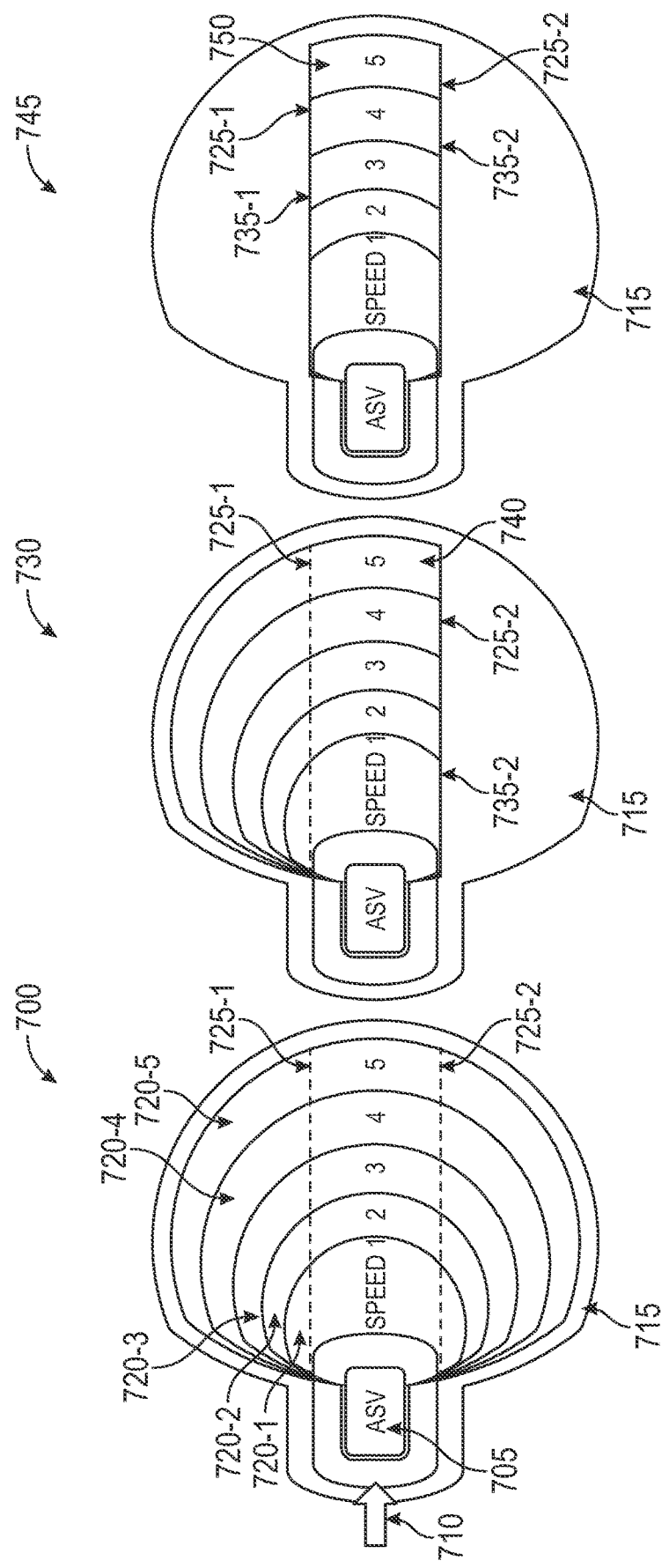
FIG. 7 is a diagram illustrating speed zones for different modes of an autonomous surface vehicle, according to one or more embodiments.

Referring also to diagram 700 of FIG. 7, an ASV 705 (one example of the ASV 505) travels in a forward direction 710. The ASV 705 has a forward sensing range 715 that is provided by the proximity sensor(s) 554. The forward sensing range 715 is divided into a plurality of speed zones 720-1, 720-2, 720-3, 720-4, 720-5 corresponding to a plurality of speed settings 526. A speed setting 526 for the ASV 705 is selected based on whether and/or where obstacles are detected within the forward sensing range 715. For example, when the safety module 535 detects an obstacle within the speed zone 720-2, the safety module 535 signals to the control module 525 to limit the currently-applied speed setting 526 according to the speed setting associated with the speed zone 720-2. In some embodiments, the safety module 535 may be further configured to limit the speed settings 526 according to one or more other operational parameters relevant to safety, such as a time of day, a number of human operators present in the environment 580, and so forth.

In some embodiments, the speed settings 526 gradually increase with increased distances from the ASV 705 such that the speed zone 720-1 corresponds to a smallest speed setting 526 and the speed zone 720-5 corresponds to a largest speed setting 526. In this way, the ASV 705 may continue to move relatively quickly when obstacles are detected further away from the ASV 705. In some embodiments, each of the speed zones 720-1, 720-2, 720-3, 720-4, 720-5 corresponds to a non-zero speed setting 526. In other embodiments, one or more of the speed zones 720-1, 720-2, 720-3, 720-4, 720-5 has a zero speed setting. For example, the speed zone 720-1 closest to the ASV 705 may have a zero speed setting.

In some embodiments, the speed zones 720-1, 720-2, 720-3, 720-4, 720-5 in the diagram 700 represents the ASV 705 operating in an unconfined (or unconstrained) mode within the environment. Described another way, the safety module 535 does not detect any physical barriers along axes 725-1, 725-2 within the forward sensing range 715.

In diagram 730, a wall 735-2 (one example of a physical barrier) is detected by the safety module 535 along the axis 725-2, and no physical barrier is detected along the axis 725-1. Thus, the diagram 730 may represent the ASV 705 driving within a first type of corridor 740 that is bounded along a single side (e.g., operating in a "wall-hugging" mode).

In some embodiments, the speed zones in the corridor 740 may correspond to increased speed settings 526 than those of the speed zones 720-1, 720-2, 720-3, 720-4, 720-5, as the wall 735-2 provides increased assurance of preventing obstacles dynamically entering the corridor 740. The number and/or sizing of the speed zones may be the same or may be different when the ASV 705 operates in the corridor 740.

In diagram 745, a wall 735-1 is detected by the safety module 535 along the axis 725-1, and the wall 735-2 is detected by the safety module 535 along the axis 725-2. Thus, the diagram 745 may represent the ASV 705 driving within a second type of corridor 750 that is bounded along both sides (e.g., operating in a "speed lane" mode).

In some embodiments, the speed zones in the corridor 750 may correspond to increased speed settings 526 than those of the speed zones 720-1, 720-2, 720-3, 720-4, 720-5 and those of the corridor 740, as the opposing walls 735-1, 735-2 provide yet further assurance of preventing obstacles dynamically entering the corridor 750. The number and/or sizing of the speed zones may be the same or may be different when the ASV 705 operates in the corridor 750.

In some embodiments, the increased speed settings 526 made possible when the ASV 705 operates in the corridor 740, 750 will be applied only when (i) the location sensor(s) 552 of the ASV 705 indicate that the ASV 705 is within the corridor 740, 750, and (ii) the proximity sensor(s) of the ASV 705 detects the wall 735-2 (e.g., a physical barrier of the corridor 740, 750). In some embodiments, detecting the wall 735-2 comprises visually detecting one or more fiducials disposed along the wall 735-2.

In some embodiments, if the sensor signals indicate that the ASV 705 is outside the corridor 740 and/or the wall 735-2 is not detected, the ASV 705 may stop applying the increased speed settings 526. In some embodiments, if either or both of the sensor signals are not detected (or not detected for greater than a predetermined time period), the ASV 705 may stop applying the increased speed settings 526. The ASV 705 may then apply the previous speed settings or other reduced speed settings 526.

In some embodiments, the ASV 705 may bypass or otherwise avoid the detected obstacle in the corridor 740, 750. In one example, the ASV 705 may exit the corridor 740, 750 to bypass the obstacle, re-enter the corridor 740, detect the wall 735-2, and resume application of the increased speed settings 526. In another example, the ASV 705 may exit the corridor 740, 750 by reversing the direction of the ASV 705. In yet another example, the ASV 705 may remain stopped in the corridor 740, 750 and signal that operator assistance is needed to remove the ASV 705 from the corridor 740, 750.

Figure 8:
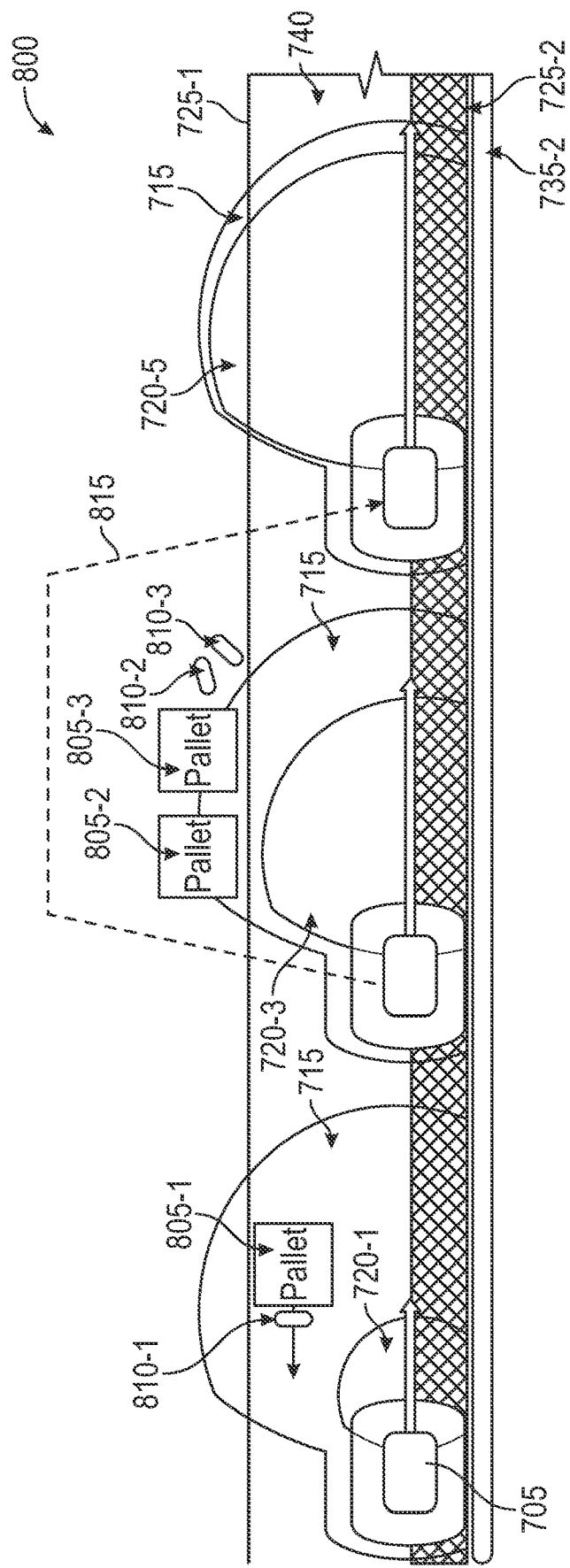
FIG. 8 is a diagram illustrating applying different speed settings during motion of an autonomous surface vehicle, according to one or more embodiments.

FIG. 8 is a diagram 800 illustrating applying different speed settings during motion of an autonomous surface vehicle, according to one or more embodiments. The diagram 800 may represent operation of the ASV 705 in the corridor 740.

As the ASV 705 travels along the corridor 740 (as shown, from left to right), the ASV 705 first detects obstacles within the forward sensing range 715 (e.g., a pallet 805-1 and a pallet jack 810-1) traveling in an opposite direction. While the obstacles are detected, the speed setting of the ASV 705 is limited to the speed setting associated with the speed zone 720-1. When the obstacles have exited the forward sensing range 715, the speed setting of the ASV 705 is no longer limited according to the speed zone 720-1.

The ASV 705 next detects obstacles within the forward sensing range 715, more specifically, pallets 805-2, 805-3 and pallet jacks 810-2, 810-3 that are statically positioned beyond the axis 725-1. While the obstacles are detected, the speed setting of the ASV 705 is limited to the speed setting associated with the speed zone 720-3. When the obstacles have exited the forward sensing range 715, the speed setting of the ASV 705 is no longer limited according to the speed zone 720-3. Alternately, the ASV 705 may exit the corridor 740 to bypass the obstacles (e.g., traveling along path 815). When the obstacles have exited the forward sensing range 715, the speed setting of the ASV 705 corresponds to the speed zone 720-5 until exiting the corridor 740, until the sensor signals indicate that ASV 705 is outside the corridor 740 and/or are not detected, until another obstacle is detected, and so forth.

Figure 6:
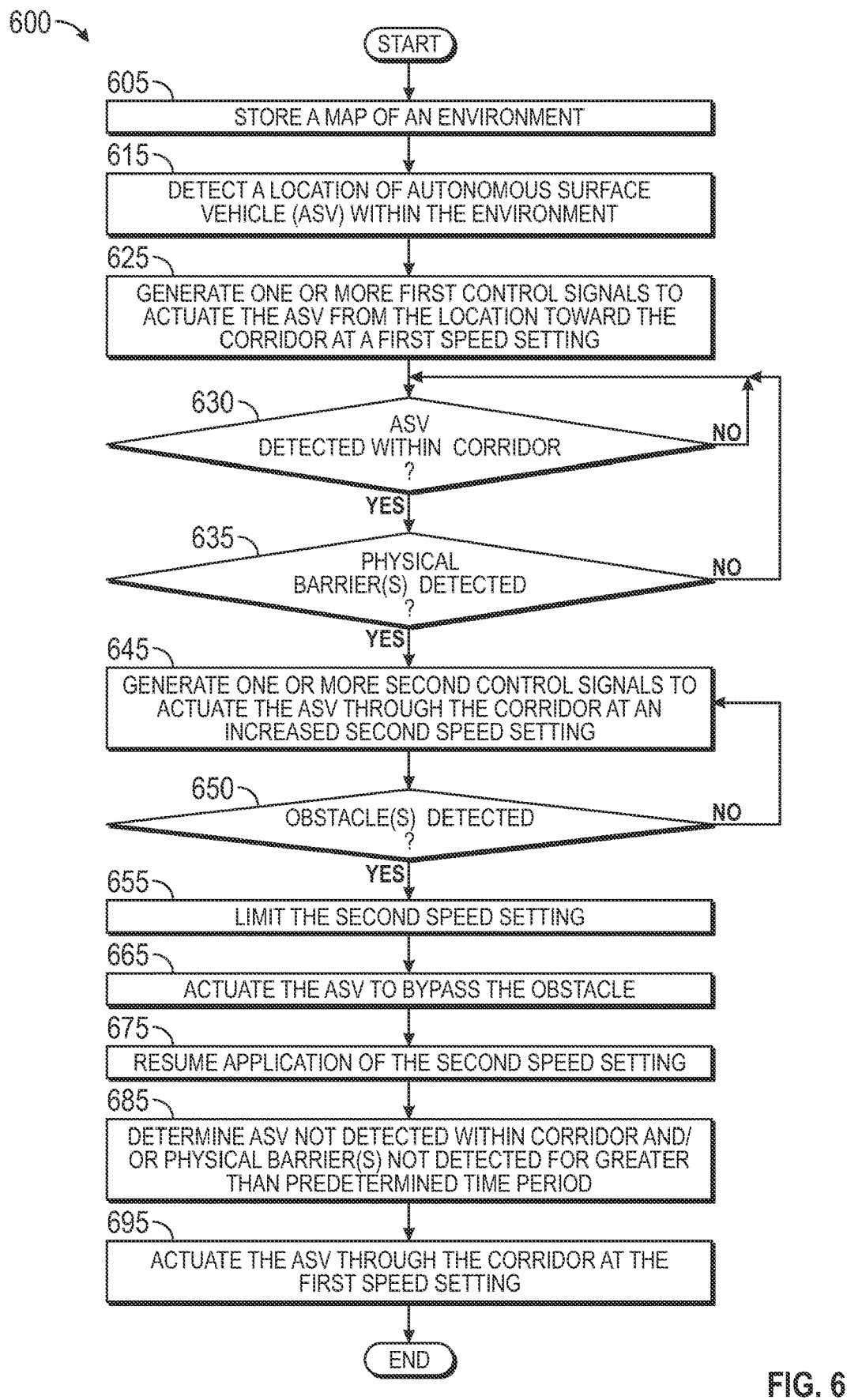
FIG. 6 is a method for use with an autonomous surface vehicle, according to one or more embodiments.

Next, FIG. 6 is a method 600 for use with an autonomous surface vehicle, according to one or more embodiments. The method 600 may be used in conjunction with other embodiments described herein. For example, the method 600 may be performed by the ASV 505 of FIG. 5, a combination of the ASV 505 and the computing device 560, and so forth.

The method 600 begins at block 605, where a map of an environment is stored by the ASV 505 or the computing device 560. In some embodiments, the map comprises physical barrier information and corridor information that defines virtual "corridors" in the environment. At block 615, a location of the autonomous surface vehicle is detected within the environment. At block 625, one or more first control signals are generated to actuate the ASV from the location toward the corridor at a first speed setting.

At block 630, it is determined whether the ASV is detected within the corridor. In some embodiments, location sensor(s) of the ASV are used to detect the ASV. If the location sensor(s) do not detect the ASV within the corridor, or the sensor signals are not detected, the method proceeds along the "No" branch to return to the block 630.

If the ASV is detected within the corridor, the method proceeds along the "Yes" branch to block 635, where it is determined whether any physical barriers of the corridor are detected. In some embodiments, proximity sensor(s) of the ASV are used to detect the physical barrier(s). In some embodiments, detecting the physical barrier(s) comprises visually detecting one or more fiducials disposed along the physical barrier(s), which is discussed in greater detail below. If the proximity sensor(s) do not detect the physical barrier(s), or the sensor signals are not detected, the method proceeds along the "No" branch to return to the block 630.

If the ASV is detected within the corridor, the method proceeds along the "Yes" branch to block 645, where the ASV generates one or more second control signals to actuate the ASV through the corridor at an increased second speed setting. At block 650, the ASV determines whether any obstacles are detected in the corridor. If no obstacles are detected, the method proceeds along the "No" branch to return to the block 645.

If one or more obstacles are detected, the method proceeds along the "Yes" branch to block 655, where the ASV limits the second speed setting. At block 665, the ASV is actuated to bypass the obstacle. At block 675, application of the second speed setting is resumed. For example, the ASV may be actuated to exit the corridor and bypass the obstacle(s), and to return to the corridor to resume application of the second speed setting.

At block 685, the ASV is not detected within the corridor and/or physical barriers are not detected for greater than a predetermined time period. At block 695, the ASV is actuated through the corridor at the first speed setting. The method ends following completion of block 695.

Figure 9:
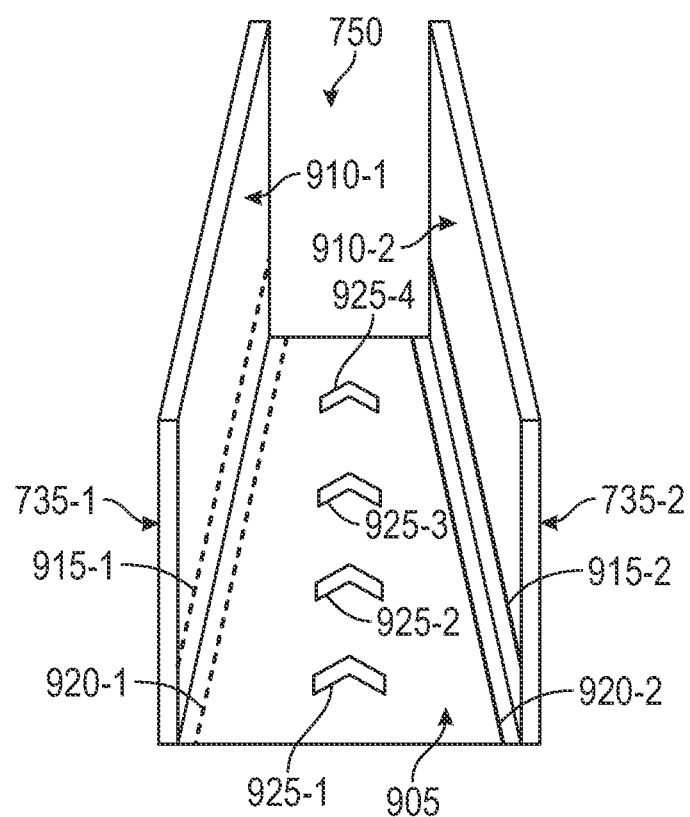
FIG. 9 is a diagram illustrating fiducials disposed along physical barriers, according to one or more embodiments.

FIG. 9 is a diagram 900 illustrating fiducials disposed along physical barriers, according to one or more embodiments. The features in the diagram 900 may be used in conjunction with other embodiments. For example, the diagram 900 may represent travel of the ASV through the corridor 750.

The ASV travels along a reference surface 905, such as a floor of the environment. The walls 735-1, 735-2 extend upward from the reference surface 905. An interior surface 910-1 of the wall 735-1 and an interior surface 910-2 of the wall 735-2 face each other. The corridor 750 is defined between the interior surfaces 910-1, 910-2.

The ASV may use fiducials to detect the physical barrier(s) defining or surrounding the corridor 750. As discussed above, detecting the physical barrier(s) may be used to apply increased speed settings while the ASV travels through the corridor 750. Some non-limiting examples of the fiducials include a pattern of spaced-apart fiducials 915-1 extending along the interior surface 910-1, a pattern of spaced-apart fiducials 920-1 extending along the reference surface 905 near the interior surface 910-1, a substantially continuous fiducial 915-2 extending along the interior surface 910-2, a substantially continuous fiducial 920-2 extending along the reference surface 905 near the interior surface 910-2.

Another non-limiting example of the fiducials include a pattern of spaced-apart fiducials 925-1, 925-2, 925-3, 925-4 extending along the reference surface 905 that indicate a directionality of travel of the ASV through the corridor 750. For example, the fiducials 925-1, 925-2, 925-3, 925-4 are shown as chevron-shaped.

Figure 10:
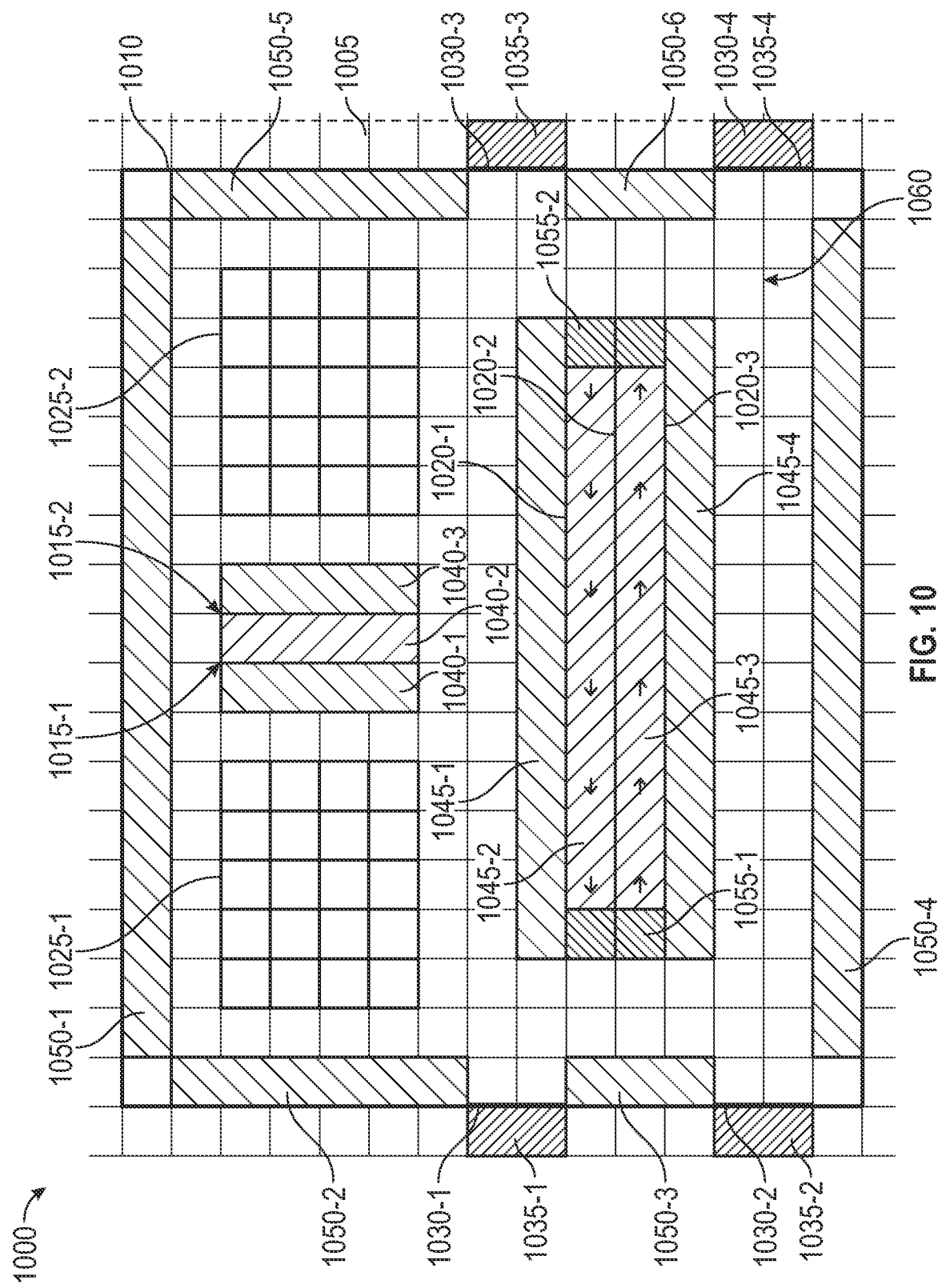
FIG. 10 is a diagram of a map defining corridors along physical barriers, according to one or more embodiments.

FIG. 10 is a diagram 1000 of a map 1005 defining corridors along physical barriers, according to one or more embodiments. The features in the diagram 100 may be used in conjunction with other embodiments. For example, the map 1005 represents one example of the map 520 of FIG. 5.

The map 1005 depicts an environment that includes a physical barrier 1010 (e.g., walls) substantially bounding the environment. Although the environment is depicted as a structured environment, the techniques may also be applied to unstructured environments. The physical barrier 1010 includes interfaces 1030-1, 1030-2, 1030-3, 1030-4 (e.g., openings in the physical barrier 1010) for ingress and/or egress of operators, inventory system components, inventory items, etc. to and from the environment. In some embodiments, stations 1035-1, 1035-2, 1035-3, 1035-4 are arranged at the interfaces 1030-1, 1030-2, 1030-3, 1030-4.

The environment further includes storage regions 1025-1, 1025-2 that are spaced apart from each other. Each of the storage regions 1025-1, 1025-2 may include a plurality of inventory holders 585. The environment further includes physical barriers 1015-1, 1015-2 (e.g., walls) arranged between the storage regions 1025-1, 1025-2 and extending parallel to each other. The environment further includes physical barriers 1020-1, 1020-2, 1020-3 that are arranged between the interfaces 1030-1, 1030-2, 1030-3, 1030-4 and that extend parallel to each other.

In the map 1005, a plurality of corridors are defined near the physical barriers. More specifically, corridors 1040-1, 1040-2, 1040-3 are defined near the physical barriers 1015-1, 1015-2, corridors 1045-1, 1045-2, 1045-3, 1045-4 are defined near the physical barriers 1020-1, 1020-2, 1020-3, and corridors 1050-1, ..., 1050-6 are defined near the physical barrier 1010.

The environment further includes one or more non-corridor areas 1060 defined between the corridors 1050-1, ..., 1050-6. In some embodiments, the ASVs are controlled to travel at lower speed settings (e.g., default speed settings) within the one or more non-corridor areas 1060, and may travel at greater speed settings within the corridors 1050-1, ..., 1050-6.

The corridor 1040-2 is defined between, and extending along, interior surfaces of the physical barriers 1015-1, 1015-2. The corridors 1040-1, 1040-3 are defined outside, and extending along, exterior surfaces of the respective physical barriers 1015-1, 1015-2. Thus, the corridors 1040-1, 1040-3 may be corridors of a first type (bounded along one side) and the corridor 1040-2 may be a corridor of a second type (bounded along both sides). As such, ASVs may be permitted to travel at greater speeds in the corridor 1040-2 than the corridors 1040-1, 1040-3.

The corridor 1045-2 is defined between, and extending along, interior surfaces of the physical barriers 1020-1, 1020-2. The corridor 1045-3 is defined between, and extending along, interior surfaces of the physical barriers 1020-2, 1020-3. The corridors 1045-1, 1045-4 are defined outside, and extending along, exterior surfaces of the respective physical barriers 1020-1, 1020-3. Thus, the corridors 1045-1, 1045-4 may be corridors of the first type and the corridors 1045-2, 1045-3 may be corridors of the second type.

In some embodiments, the corridors 1045-2, 1045-3 are assigned a direction of travel for the ASVs. In this way, the corridor 1045-2 may provide a dedicated high-speed lane in one direction, and the corridor 1045-3 may provide a dedicated high-speed lane in the other direction. In some embodiments, an entry region 1055-1 is defined for entering the corridor 1045-3, and an entry region 1055-2 is defined for entering the corridor 1045-3. In alternate embodiments, other corridors may also be assigned a direction of travel. In other alternate embodiments, none of the corridors are assigned a direction of travel, so that ASVs are generally permitted to travel in either direction along the various corridors.

In some embodiments, the map 1005 is generated based on the preexisting (static) physical configuration of the environment. In other embodiments, the map 1005 may be generated to prescribe placement of one or more physical barriers within the environment (e.g., positions and/or orientations for movable room dividers). In one example, generating the map 1005 comprises simulating operation of the inventory system (e.g., ASV traffic) and prescribing placement of the physical barrier(s) in locations to improve inventory throughput or other performance parameter(s). Further, in some embodiments, the map and/or the layout of the environment may be generated using data acquired during operation of the ASVs. For example, location data and obstacle data acquired by the ASVs may be processed to determine traffic characteristics within the environment in the particular physical configuration.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the invention may be devised without departing from the basic scope thereof, and the scope thereof is determined by the claims that follow.

What is claimed is:

1. An autonomous surface vehicle (ASV) for operation within an inventory system of an environment, the ASV comprising:
   a drive system;
   a docking system configured to engage and transport an inventory holder through the environment;
   a plurality of sensors comprising a location sensor and one or more proximity sensors;
   a memory storing a map of the environment; and
   one or more computer processors configured to:
      detect, using the location sensor, a location of the ASV within the environment;
      control the drive system to actuate the ASV from the location toward a corridor defined in the map, wherein a first speed setting is applied while actuating the ASV toward the corridor; and
      control the drive system to actuate the ASV through the corridor along at least one barrier defined in the map, wherein a second speed setting greater than the first speed setting is applied when (i) the location sensor indicates that the ASV is within the corridor and (ii) one or more fiducials along the at least one barrier are visually detected by the one or more proximity sensors.

2. The ASV of claim 1, wherein the at least one barrier comprises a virtual barrier defined in the map.

3. The ASV of claim 1, wherein the at least one barrier comprises a physical barrier that restricts entry of obstacles into the corridor.

4. The ASV of claim 3,
   wherein a first value of the second speed setting is applied when one physical barrier is detected,
   wherein a second value of the second speed setting greater than the first value is applied when two physical barriers, arranged along opposing sides of the corridor, are detected.

5. The ASV of claim 1, wherein the one or more computer processors are configured to:
   limit the second speed setting responsive to detecting an obstacle within the corridor.

6. A computer-implemented method for use with an autonomous surface vehicle (ASV), the method comprising:
   storing a map of an environment, wherein the map defines one or more barriers and a corridor along the one or more barriers;
   detecting a location of the ASV within the environment;
   generating one or more first control signals to actuate the ASV from the location toward the corridor at a first speed setting; and
   generating one or more second control signals to actuate the ASV through the corridor at an increased second speed setting when (i) the ASV is detected to be within the corridor and (ii) one or more fiducials along the at least one barrier of the corridor are detected by one or more proximity sensors of the ASV.

7. The method of claim 6, wherein detecting the location of the ASV within the environment and detecting the ASV to be within the corridor comprise:
   receiving sensor signals from a location sensor of the ASV.

8. The method of claim 6,
   wherein the at least one barrier comprises a physical barrier that restricts entry of obstacles into the corridor,
   wherein a first value of the second speed setting is applied when one physical barrier is detected, and
   wherein a second value of the second speed setting greater than the first value is applied when two physical barriers, arranged along opposing sides of the corridor, are detected.

9. The method of claim 6, further comprising:
   limit the second speed setting responsive to detecting an obstacle within the corridor.

10. The method of claim 9, wherein actuating the ASV through the corridor comprises:
    actuating the ASV to bypass the obstacle; and
    resuming application of the second speed setting after bypassing the obstacle.

11. The method of claim 10,
    wherein bypassing the obstacle comprises the ASV exiting the corridor, and
    wherein resuming application of the second speed setting comprises the ASV re-entering the corridor and detecting the at least one physical barrier.

12. The method of claim 6, wherein detecting the at least one physical barrier comprises:
    visually detecting one or more fiducials disposed along the at least one physical barrier.

13. The method of claim 6, wherein actuating the ASV through the corridor comprises:
    actuating the ASV through the corridor at the first speed setting responsive to determining that (i) or (ii) is not true.

14. The method of claim 13, wherein determining that (i) or (ii) is not true comprises determining that (i) or (ii) is not true for greater than a predetermined time period.

15. A computer program product comprising:
    a computer-readable storage medium having computer-readable program code embodied therewith, the computer-readable program code executable by one or more computer processors to perform an operation for use with an autonomous surface vehicle (ASV), the operation comprising:
       accessing a map of an environment, wherein the map defines one or more barriers and a corridor along the one or more barriers;
       detecting a location of the ASV within the environment;

generating one or more first control signals to actuate the ASV from the location toward the corridor at a first speed setting; and generating one or more second control signals to actuate the ASV through the corridor at an increased second speed setting when (i) the ASV is detected to be within the corridor and (ii) one or more fiducials along the at least one barrier of the corridor are detected by one or more proximity sensors of the ASV.

16. The computer program product of claim 15, wherein detecting the location of the ASV within the environment and detecting the ASV to be within the corridor comprise:

receiving sensor signals from using a location sensor of the ASV.

17. The computer program product of claim 15, wherein a first value of the second speed setting is applied when one physical barrier is detected, wherein a second value of the second speed setting greater than the first value is applied when two physical barriers, arranged along opposing sides of the corridor, are detected.

18. The computer program product of claim 15, the operation further comprising:

limiting the second speed setting responsive to detecting an obstacle within the corridor.

19. The computer program product of claim 15, wherein detecting the one or more fiducials comprises:

visually detecting the one or more fiducials disposed along the at least one barrier.

20. The computer program product of claim 15, wherein actuating the ASV through the corridor comprises:

actuating the ASV through the corridor at the first speed setting responsive to determining that (i) or (ii) is not true.

* * * * *